(12) United States Patent
Sun et al.

(10) Patent No.: US 9,635,601 B2
(45) Date of Patent: Apr. 25, 2017

(54) 802.11 PHY HASHED SSID

(75) Inventors: Sheng Sun, Kanata (CA); Jung Hoon Suh, Kanata (CA); Osama Aboul-Magd, Kanata (CA); Kwok Shum Au, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 741 days.

(21) Appl. No.: 13/453,549

(22) Filed: Apr. 23, 2012

(65) Prior Publication Data
US 2013/0235859 A1 Sep. 12, 2013

Related U.S. Application Data

(60) Provisional application No. 61/609,158, filed on Mar. 9, 2012.

(51) Int. Cl.
*H04W 88/08* (2009.01)
*H04W 48/08* (2009.01)
*H04W 84/12* (2009.01)

(52) U.S. Cl.
CPC ............ *H04W 48/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2010/0097935 A1* | 4/2010 | Belmonte | H04B 17/309 370/241 |
| 2010/0165910 A1* | 7/2010 | Mathews | H04B 7/15528 370/315 |
| 2013/0223422 A1* | 8/2013 | Abraham | H04L 1/0003 370/338 |

* cited by examiner

*Primary Examiner* — Yemane Mesfin
*Assistant Examiner* — Jeff Banthrongsack
(74) *Attorney, Agent, or Firm* — Slater Matsil, LLP

(57) ABSTRACT

An access point (AP) hashes its SSID/BSSID according to a hashing function H and transmits wirelessly the hashed SSID/BSSID within a physical layer frame/packet to a user station (STA). The hashed SSID/BSSID uniquely identifies the AP. In one embodiment, the hashed SSID/BSSID is transmitted within a SIGNAL field of a preamble with the frame/packet. Upon receipt, the user station recovers the hashed SSID/BSSID and compares it to an expected hashed SSID/BSSID (calculated using the same hashing function H and a desired SSID/BSSID). In response to the comparison, the user station performs one or more actions.

16 Claims, 3 Drawing Sheets

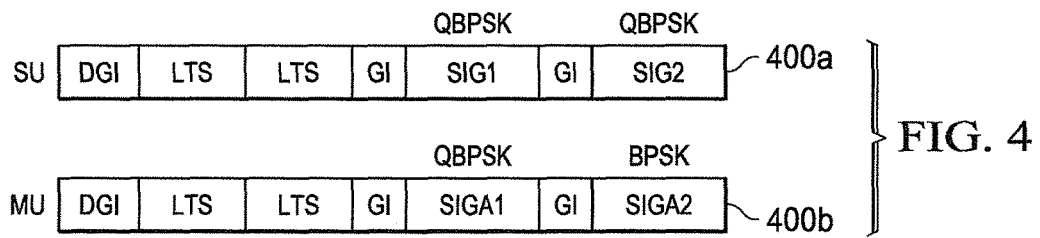
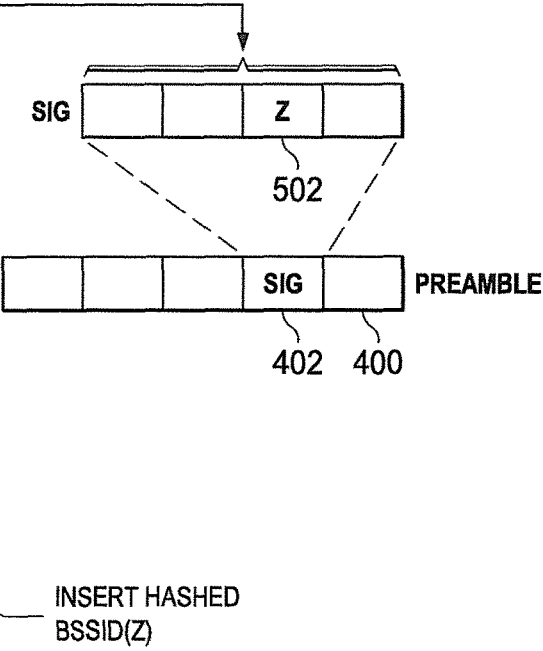
FIG. 5

802.11 PHY HASHED SSID

CROSS REFERENCE TO RELATED APPLICATION(S)

This application claims priority under 35 USC 119(e) to U.S. provisional Application Ser. No. 61/609,158, filed on Mar. 9, 2012, and which is incorporated herein by reference.

TECHNICAL FIELD

The present invention relates generally to wireless communication systems, and more particularly to methods and devices for generating hashed SSID/BSSID information for use in a wireless network for fast recovery, such as one specified in the IEEE 802.11 standards or specifications.

BACKGROUND

FIG. 1 is a high-level diagram used to illustrate a conventional IEEE 802.11 compliant wireless network 100 (also known as Wireless Fidelity (WiFi)). The 802.11 architecture includes several main components: one or more stations (STA) 102, one or more wireless access points (AP) 104, one or more basic service sets (BSS) 106 (sometimes referred to as just service sets (SS)), and a distribution system (DS) 108. As will be appreciated, the STAs and wireless APs are physical hardware devices. The BSS 106a is a wireless network having a single wireless AP 104a supporting one or multiple wireless STAs or clients 102a. Each BSS 106 itself can be referred to as a wireless network. The STAs in a particular BSS communicate through that BSS' AP which provides connectivity to a backbone network. In the embodiment shown, the APs 104 of multiple BSSs 106 are interconnected by the DS 108, but may necessarily communicate with each other, and may interface with system controller (not shown).

The current scanning scheme (scanning for access points) is specified in the 802.11 standard, which standards (including all versions) are hereby incorporated by reference. Currently, each AP is capable of employing up to fourteen (14) channels (the actual number depends on the location of implementation) and in the United States there are eleven (11) channels. The conventional scanning scheme typically proceeds with the STA scanning all channels and staying at each channel for a specified maximum time. For this, there are two types of scanning: active scanning (probe request/response) and passive scanning (beacon). In active scanning, the STA broadcasts a probe request (802.11) on each of the channels. This probe request utilizes a zero-length broadcast service set identifier (SSID). Upon receipt of the probe responses, the STA adds the BSSIDs included in those responses to the BSSID scan list stored in its memory. In passive scanning, the STA does not transmit a probe request, but instead dwells on each channel for a predetermined time period and adds BSSIDs included in any received beacons to the BSSID scan list stored in its memory.

The main problem with the conventional scanning techniques is the amount of time consumed (or delay) in order to complete a scan—the processing is performed at the media access control (MAC) layer. In the 2.4 GHz band, scanning through all supported channels can take upwards of 2 seconds, and in the 5 GHZ band can take upwards of 3 seconds. Further, the time waiting to receive the beacons in each channel in passive scanning in order to match the STA's desired BSSID information may be significant. Additionally, active scanning requires scans in each channel until the probe timer reaches a maximum channel time.

Accordingly, there are needed methods, devices and systems that allow or enable the STA to listen/scan the channels and check at the same time for the received SSID/BSSID (of a particular channel). This may be accomplished by processing at PHY layer rather than the MAC layer.

SUMMARY

In accordance with one embodiment, there is provided a method for generating a unique identifier for a wireless access point within a wireless network. The method includes combining an ID of the wireless access point with channel information of a predetermined channel to generate combined ID/channel information having a first number of data bits. The combined ID/channel information subject (applied) to a hashing function H to generate a hashed ID, the hashed ID having a second number of data bits and less than the first number of data bits. The hashed ID is transmitted wirelessly within a physical layer frame. In other embodiments, the ID is an SSID or a BSSID.

In accordance with another embodiment of the present disclosure, there is provided an access point device having an antenna, a processor and a transceiver. The processor is operable for combining an ID of the wireless access point device with channel information of a predetermined channel to generate combined ID/channel information, the combined ID/channel information comprising a first number of data bits, and applying a hashing function H to the combined ID/channel information to generate a hashed ID, the hashed ID comprising a second number of data bits and less than the first number of data bits. The transceiver is coupled to the processor and the antenna for transmitting the hashed ID wirelessly within a physical layer frame via the antenna. In other embodiments, the ID is an SSID or a BSSID.

In still another embodiment, there is provided a wireless user station including an antenna, a transceiver coupled to the antenna and operable for receiving a hashed ID wirelessly within a physical layer frame/packet received at the antenna, wherein the hashed ID uniquely identifies a remote access point device, and a processor coupled to the transceiver, the processor operable for comparing the received hashed ID to the expected hashed ID, and initiating an action based on a result of the comparison. In other embodiments, the hashed ID is a hashed SSID or a hashed BSSID.

In yet another embodiment, there is provided a method for generating a unique identifier for a wireless access point within a wireless network, the method including applying a hashing function H to an BSSID of the wireless access point to generate a hashed BSSID, the BSSID having a first number of bits comprising at least 48 bits, the hashed BSSID comprising a second number of bits which are less than the first number of bits of the BSSID. The hashed BSSID is wirelessly transmitted within a physical layer frame to a wireless device.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 4 illustrates examples of a preamble used in a single user mode and a preamble used in a multi user mode; and FIG. 5 illustrates various sub-fields within a signal field within a preamble.

DETAILED DESCRIPTION

Figure 1:
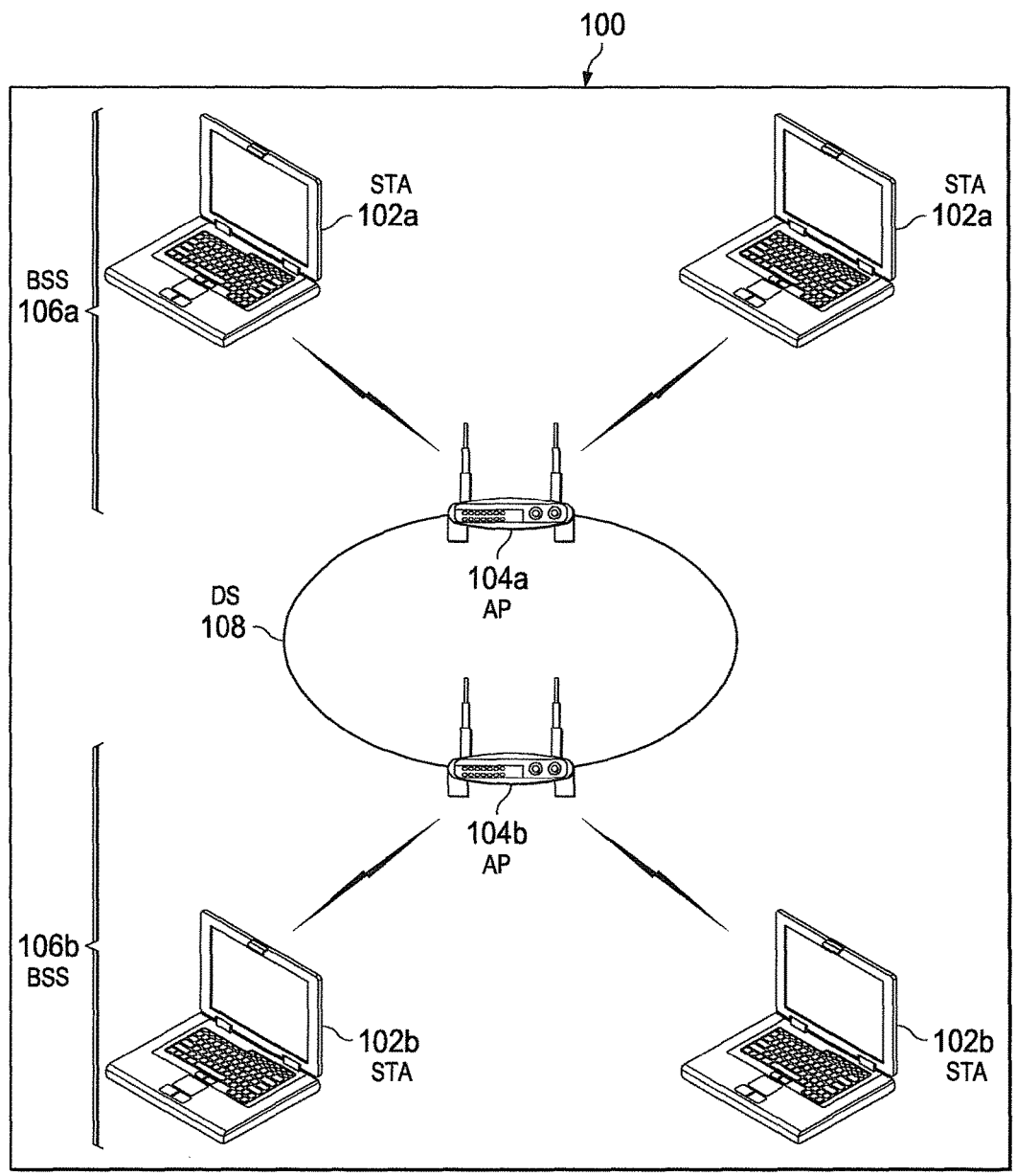
FIG. 1 depicts in block diagram form a conventional wireless communications network in accordance with IEEE 802.11.

FIG. 1 illustrates an example wireless communications network architecture or system 100 in which the various methods and/or devices may be utilized in accordance with the present disclosure. The system or network 100 shown in FIG. 1 is for illustration purposes only. Other embodiments of the system 100 may be used without departing from the scope of this disclosure. Reference to "standards" in the following text is meant to encompass existing and future versions of the referenced standards, as well as standards encompassing the principles of the invention disclosed and claimed herein. It will be understood that the system 100 may also be configured to include various devices or components, not shown, or be designed with different configurations. In this example, the system 100 is part of (or communicates with) a larger communication services network (not shown).

Other components, devices or networks may be included in the system 100, and FIG. 1 only illustrates but one exemplary configuration to assist in describing the system and operation of the present disclosure to those skilled in the art. The system represented in FIG. 1 may be described using different nomenclature or system terminology, such as use of the terms user equipment (UE), access terminal (AT) or mobile subscriber terminals (MS or MT), and base station or base transceiver station (BTS) or access points, and mobile switching center (MSC). The use of any given nomenclature to describe a device within the system 100 is not intended to limit the scope of this disclosure.

As will be appreciated, additional or fewer STAs 102, APs 104 and/or BSSs 106 may be included in the network 100. Different configurations of system 100 may be utilized in accordance with the present disclosure. The access points 104 typically include the functionality for providing access functions for the STAs 102 (such as an 802.11 compliant STA).

The structure and functionality of the STAs 102 and the APs 104 are generally well-known. Each generally includes various components such as processing units, controllers and network interfaces, which necessarily include but are not limited to, microprocessors, microcontrollers, memory devices, and/or logic circuitry, and these may be adapted to implement various algorithms and/or protocols. No additional description of the conventional components and software processes (functionality) of the STAs or APs, other than as noted herein or relevant for an understanding of the present disclosure, is provided, as these are known to those of ordinary skill in the art. It will be understood that the STAs and APs may be constructed or configured from any suitable hardware, software, firmware, or combination thereof for providing the functionality known to those of ordinary skill in the art. The STAs 102 and/or APs 104 will include additional functionality as described below in accordance with one or more embodiments.

Figure 2:
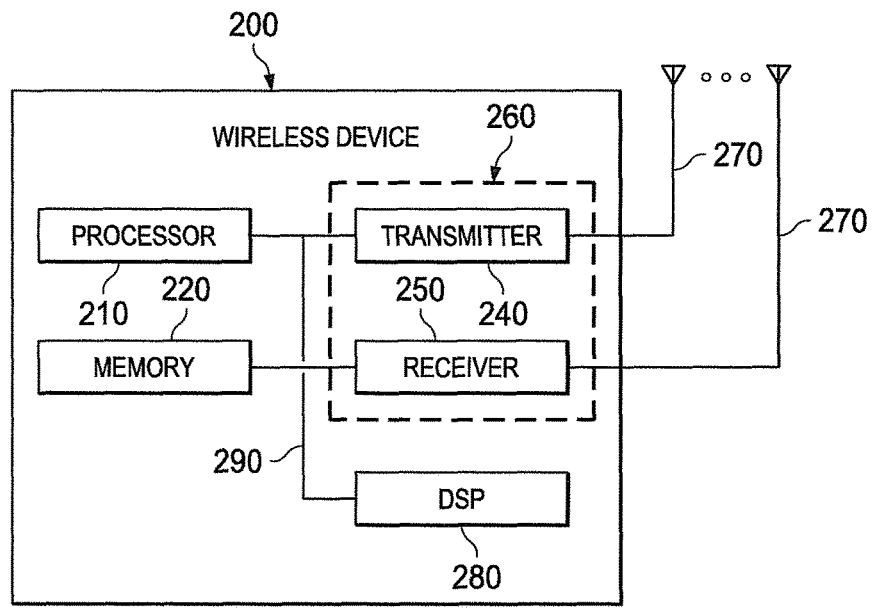
FIG. 2 is a block diagram illustrating various components in a wireless device in accordance with certain embodiments of the present disclosure.

Now turning to FIG. 2, there are illustrated various components that may be utilized in a wireless device 200 that may be employed within the system 100. The wireless device 200 illustrated in FIG. 2 may be an STA 102 or an access point 104. The wireless device 200 is an example of a device that may be configured (as an STA or AP) to implement the various methods and teachings described herein.

The wireless device 200 includes a processor 210 (and may be referred to as a CPU) operable for controlling operation of the wireless device 200. Memory 220, such as read-only memory (ROM) and/or random access memory (RAM), provides instructions and data to the processor 210. It will be understood that a portion of the memory 220 may also be non-volatile random access memory (NVRAM). The processor 210 is configured to perform logical and arithmetic operations based on program instructions stored within the memory 220. These instructions may be executable to implement the methods described herein.

The wireless device 200 includes a housing 230 that includes a transmitter 240 and a receiver 250 (forming a transceiver 260) enabling transmission and reception of data between the wireless device 200 and a remote location (such as the AP and STA). A plurality of antennas 270 (e.g., transmit and receive) are electrically coupled to the transceiver 260. The wireless device 200 may also include multiple transmitters, multiple receivers and multiple transceivers (though not shown).

The wireless device 200 may also include a digital signal processor (DSP) 280 for use in processing signals (received or to be transmitted. The components of the wireless device 200 may be coupled together by a bus system 290, which may include a power bus, a control signal bus, and a status signal bus in addition to a data bus.

It will be understood that the STAs 102 and APs 104 may be constructed or configured from any suitable hardware, software, firmware, or combination thereof for providing the functionality known to those of ordinary skill in the art. These devices may include additional functionality as described below in accordance with one or more embodiments.

The STA 102 (communication device) represents a device utilized by a user or subscriber during communication sessions over/within the system 100. For example, each of the communication devices may include an input/output device having a microphone and speaker to capture and play audio information. Optionally, the communication devices may also include a camera and/or a display to capture/display video information. During a communication session, the STA 102 communicates with an AP 104 coupled/connected to the system 100 (or within the system 100). In this way, the STA 102 may exchange audio, video, graphical, or other information during a communication session. The STAs 102 are constructed or configured for transmitting or receiving information over a network. As an example, the STA 102 could represent a telephone, videophone, computer, personal digital assistant, and the like, etc.

In general terms, the main concept of the present disclosure is the generation of a hashed SSID or BSSID that is transmitted by the access point within the PHY layer. Within 802.11 compliant systems, each access point has a unique identification number—referred to as a "BSSID" (basic service set identifier)—that is currently defined to be either 48-bits long (e.g., MAC address of AP) or 46-bits long (e.g., locally administered and generated MAC address). In addition, the access point may be associated with an "SSID" (service set identifier) for a group of interconnected BSSs. SSIDs are typically up to a maximum of 32 octets of ASCII characters.

For reference purposes herein, a reference to "SSID" will refer only to an SSID, and a reference to "BSSID" will refer only to a BSSID. In addition, use of the term "SSID/BSSID" refers to either an SSID or a BSSID.

The SSID/BSSID is transmitted by the access point within the MAC layer in the probe responses or beacons. In an embodiment of the present disclosure, the access point generates a "hashed SSID" or "hashed BSSID." This hashed SSID/BSSID is generated by applying a hashing function to the access point's SSID or BSSID which reduces the number of bits to a number that is substantially less than the original number of bits (e.g., 46 or 48 bits for BSSID, and up to 32 octets of ASCII for SSID). In one specific embodiment, the hashed SSID/BSSID is eight (8) bits or less. In addition, the hashed SSID/BSSID is transmitted within the physical (PHY) layer, such as a PHY layer convergence procedure (PLCP) frame/header or PHY header/frame/packet transmitted by the access point. As will be appreciated, the hashed SSID/BSSID may be inserted at any operable location within such header/frame/packet, including in a data field within a preamble or other field. In one embodiment, the hashed SSID/BSSID information is inserted within the preamble of a physical layer convergence procedure (PLCP) frame/header or within some other physical layer frame/header/data packet.

In one embodiment, the hashed SSID/BSSID is inserted into the SIGNAL (SIG) field in a single user (SU) mode, or the SIGNALA (SIGA) field in a multi-user (MU) mode, within the preamble. As will be appreciated, this may include any "Signal" field regardless of the type of preamble (e.g., Very High Throughput (VHT), legacy, etc.). And, the data bits (or one or more symbols) representing the hashed SSID/BSSID may be inserted into a "Reserved" sub-field within the SIG/SIGA field.

In another embodiment, the SSID/BSSID is combined with channel information, and the combined (SSID/BSSID)/channel information bits are hashed using a hashing function H to generate the hashed SSID/BSSID (Z). The hashed SSID/BSSID (Z) is then transmitted by the access point for reception by a station. The station receives the hashed SSID/BSSID (Z) information, calculates an expected hashed SSID/BSSID (Z') based on the desired SSID/BSSID and channel and hashing function H. The station then compares Z' to Z. If a match, then the station proceeds with a session on the identified channel. If no match, the station inspects PHY packets or frames on another channel, and performs the calculations to determine if a match, if not, then the process continues with another channel, and so on.

Figure 3:
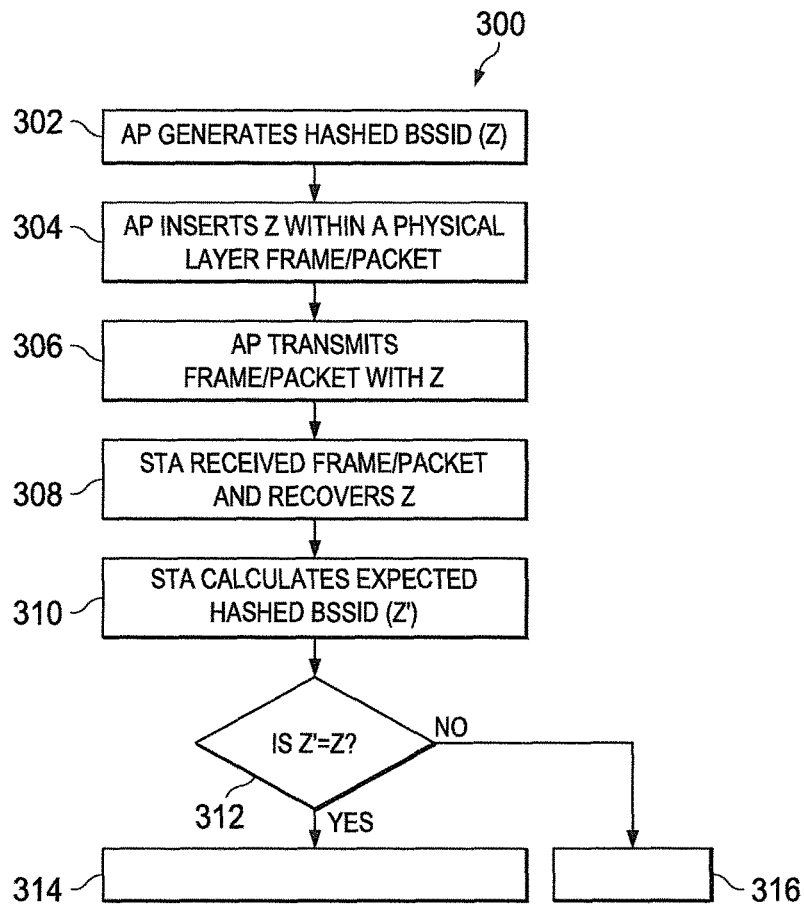
FIG. 3 illustrates an example method in accordance with the present disclosure.

Now referring to FIG. 3, there is illustrated an overall method or process 300 of generating, communicating and receiving, and processing a hashed SSID/BSSID within the system 100. As will be appreciated, the following embodiment is described with respect to a BSSID, and in another embodiment, the "BSSID" could be replaced the "SSID".

The AP 104 calculates or generates a hashed SSID/BSSID using the following relation. With respect to hashing the BSSID, then:

$$Z_{n\ bits} = H_{n\ bits}(BSSID_{48\ bits} \oplus Ch)$$

where Z is the hashed BSSID, H is the hashing function, BSSID is the BSSID, and Ch is the channel information (Step 302). With respect to hashing the SSID, then:

$$Z_{n\ bits} = H_{n\ bits}(SSID \oplus Ch)$$

where Z is the hashed SSID, H is the hashing function, SSID is the SSID, and Ch is the channel information (also Step 302).

As will be appreciated, inclusion of channel information may be optional.

Further, the hashed SSID/BSSID may be generated using any suitable hashing function, and may or may not include channel information. The main goal(s) of generating the hashed SSID/BSSID is to reduce the number of SSID/BSSID bits (e.g., less than the conventional 46 or 48 identifying bits for BSSID, and less bits for the SSID) transmitted to the STAs while still uniquely representing the AP's SSID/BSSID. As will be understood, different hashing functions H may be utilized and the number of bits n for the hashed SSID/BSSID may be any suitable number (less than 48 or more bits). However, in embodiments, the number n is 10 bits or less, and could be 8 bits or less (due to space constraints in the SIG/SIGA field).

In the BSSID embodiment, the BSSID (e.g., 48 bits) is combined with channel information to generate combined BSSID/channel information having a first number of bits (which may be greater than, less than or equal to 46/48 bits). In one embodiment, the BSSID is combined with the Channel information using an exclusive-OR function. For example, the Channel information could be encoded in binary bits (e.g., 8 bits) and are typically pre-defined for a specific band. Functions other than the exclusive-OR function may be utilized. The hashing function H is applied to the combined BSSID/channel information to generate the hashed BSSID (Z) having a second number of bits which is less than the first number of bits. Again, the number of bits n for the hashed BSSID may be any suitable number (less than 46/48 bits), but in one embodiment, the number n is 8 or less.

In the SSID embodiment, the SSID (e.g., variable length, but maximum of 32 octets)) is combined with channel information to generate combined SSID/channel information having a first number of bits (which may be greater than, less than or equal to the number of bits of the SSID). In one embodiment, the SSID is combined with the Channel information using an exclusive-OR function. For example, the Channel information could be encoded in binary bits (e.g., 8 bits) and are typically pre-defined for a specific band. Functions other than the exclusive-OR function may be utilized. The hashing function H is applied to the combined SSID/channel information to generate the hashed SSID (Z) having a second number of bits which is less than the first number of bits. Again, the number of bits n for the hashed SSID may be any suitable number (less than the original number of bits of the SSID), but in one embodiment, the number n is 8 or less.

As will be appreciated, the AP 104 may calculate the hashed SSID/BSSID (Z) once (e.g., reset, power up) and store it within its memory 220. Alternatively, the AP 104 may receive the hashed SSID/BSSID (Z) from an external source or device and store it for later use. In these embodiments, the AP 104 may not need to calculate the hashed SSID/BSSID (Z) but may retrieve from memory the stored hashed SSID/BSSID (Z) for inclusion into the SIG field of the preamble.

The AP 104 constructs a preamble in accordance with certain aspects of the present disclosure, with the preamble including a Signal (SIG) field. The generated hashed SSID/BSSID (Z) is inserted within the SIG field (Step 304). In one specific embodiment, the hashed SSID/BSSID is inserted in a Reserved sub-field 502 (see FIG. 5). The AP 104 transmits the constructed SIG field within the preamble of every packet to one or more STAs 102 (or possibly another access point) (Step 306).

The STA 102 receives and decodes the preamble to recover the hashed SSID/BSSID (Z) (Step 308). The STA 102 calculates or generates an expected hashed SSID/BSSID using the following relation. With respect to hashing the BSSID, then:

$$Z_{n\ bits} = H_{n\ bits}(BSSID_{48\ bits} \oplus Ch)$$

where Z' is the expected hashed BSSID, H is the hashing function, BSSID is the desired BSSID, and Ch is the channel information (Step 310). With respect to hashing the SSID, then:

$$Z_{n\ bits} = H_{n\ bits}(SSID \oplus Ch)$$

where Z' is the expected hashed SSID, H is the hashing function, SSID is the desired SSID, and Ch is the channel information (also Step 310).

As noted previously, inclusion of channel information may be optional.

The recovered hashed SSID/BSSID (Z) is compared to the calculated expected hashed SSID/BSSID (Z') (Step 312). If there is a match, the STA 102 associates with the AP 104 (Step 314). If no match, then the STA does not associate (Step 316). In addition, one or more different actions may be performed when there is a match, and one or more different action may be performed when there is not a match.

It will be understood that the AP 104 performs steps 302, 304 and 306 within the process 300, and this constitutes a method of generating a hashed SSID/BSSID using the access point's SSID/BSSID and channel information and a hashing function H, including the hashed SSID/BSSID within a physical layer frame or packet (e.g., in the preamble), and transmitting the frame or packet wirelessly to the STA 102. The STA 102 performs steps 308, 310, 312, 314 and/or 316 within the process 300, and this constitutes a method of receiving at the STA 102 the transmitted frame or packet that includes the hashed SSID/BSSID, calculating an expected hashed SSID/BSSID using a desired SSID/BSSID and channel information and the hashing function H, and comparing the expected hashed SSID/BSSID with the received hashed SSID/BSSID, and performing one or more actions based on the comparison result.

Now turning to FIG. 4, there are illustrated two examples of preamble structures 400a, 400b of a frame in accordance with certain aspects of the present disclosure. The preambles 400a, 400b may be transmitted in accordance with IEEE 802.11 family of wireless communications standards from the AP 104 to the STAs 102 of the wireless network system 100 illustrated in FIG. 1. The preamble 400a may be a preamble structure for use in a single user (SU) mode (transmitted to a single STA), while the preamble 400b may be a preamble structure for use in a multi user (MU) mode (transmitted to multiple STAs). Each of the preambles 400a, 400b includes at least one SIGNAL field 402a, 402b, and may include others.

Now turning to FIG. 5, there is illustrated the preamble 400, including a SIG field 402. The table illustrates one example of a plurality of sub-fields or portions (and number of bits per sub-field) within the SIG field 402 of the preamble 400 in accordance with certain aspects of the present disclosure. As illustrated, various sub-fields may be included, such as Length/Duration, MCS, BW, Aggregation, STBC, Coding, SGI, GID, Nsts, PAID, Reserved, CRC, and Tail. As shown, a Reserved sub-field 502 may include 8 bits in the SU mode or 10 bits in the MU mode. The present disclosure proposes to insert the hashed SSID/BSSID (Z) within the Reserved sub-field 502 within the Signal field 402 of the preamble 400.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for generating a unique identifier for a wireless access point within a wireless network, the method comprising:
   combining, using a combining function, an ID of the wireless access point with channel information of a predetermined channel to generate combined ID/channel information, the combined ID/channel information having a first number of data bits, wherein combining comprises combining the ID with the channel information using an exclusive-OR function;
   applying a hashing function H to the combined ID/channel information to generate a hashed ID, the hashed ID comprising a second number of data bits and less than the first number of data bits, wherein the ID is at least a one of an SSID and a BSSID, the combined ID/channel information is at least a one of a combined SSID/channel information and a combined BSSID/channel information, and the hashed ID is a one of a hashed SSID and a hashed BSSID; and
   transmitting the hashed ID wirelessly within a physical layer frame/packet.

2. The method in accordance with claim 1 further comprising:
   transmitting the hashed ID wirelessly within a signal field of a preamble in the physical layer frame/packet.

3. The method in accordance with claim 1 wherein the second number of data bits is less than or equal to 10.

4. The method in accordance with claim 1 wherein the ID is a BSSID and comprises at least 46 bits.

5. An access point device, comprising:
an antenna;
a processor operable for:
  combining, using a combining function, an ID of the access point device with channel information of a predetermined channel to generate combined ID/channel information, the combined ID/channel information having a first number of data bits, wherein the combining comprises combining the ID with the channel information using an exclusive-OR function, and
  applying a hashing function H to the combined ID/channel information to generate a hashed ID, the hashed ID comprising a second number of data bits and less than the first number of data bits, wherein the ID is at least a one of an SSID and a BSSID, the combined ID/channel information is at least a one of a combined SSID/channel information and a combined BSSID/channel information, and the hashed ID is a one of a hashed SSID and a hashed BSSID; and
a transceiver coupled to the processor and the antenna for transmitting the hashed ID wirelessly within a physical layer frame/packet via the antenna.

6. The access point device in accordance with claim 5 wherein the processor is further operable for:
inserting the hashed ID within a signal field of a preamble in the physical layer frame/packet.

7. The access point device in accordance with claim 5 wherein the second number of data bits is less than or equal to 10.

8. The access point device in accordance with claim 5 wherein the ID is a BSSID that comprises at least 46 bits.

9. A wireless user station, comprising:
an antenna;
a transceiver coupled to the antenna and operable for receiving a hashed ID wirelessly within a physical layer frame received at the antenna, the hashed ID uniquely identifying a remote access point device and a channel of the remote access point device; and
a processor coupled to the transceiver, the processor operable for:
  generating an expected hashed ID by:
    combining a desired ID with channel information of a predetermined channel to generate combined ID/channel information, the combined ID/channel information comprising a first number of data bits, wherein the combining comprises combining the desired ID with the channel information using an exclusive-OR function, and
    applying a hashing function H to the combined ID/channel information to generate the expected hashed ID, the expected hashed ID comprising a second number of data bits and less than the first number of data bits,
  wherein the received hashed ID is at least a one of a received hashed SSID and a received hashed BSSID, the combined ID/channel information is at least a one of a combined SSID/channel information and a combined BSSID/channel information, and the expected hashed ID is a one of an expected hashed SSID and an expected hashed BSSID,
  comparing the received hashed ID to the expected hashed ID, and
  initiating an action based on a result of the comparison.

10. The wireless user station in accordance with claim 9 wherein the processor is further operable for:
retrieving the received hashed ID within a signal field of a preamble in the physical layer frame.

11. The wireless user station in accordance with claim 9 wherein the second number of data bits is less than or equal to 10.

12. The wireless user station in accordance with claim 9 wherein the desired ID is a desired BSSID comprising at least 46 bits.

13. The wireless user station in accordance with claim 9 wherein the wireless user station functions in compliance with one or more versions of an IEEE 802.11 standard.

14. A method for generating a unique identifier for a wireless access point within a wireless network, the method comprising:
combining a BSSID of the wireless access point with channel information of the wireless access point using an exclusive-OR function to generate combined BSSID/channel data;
applying a hashing function H to the combined BSSID/channel data to generate a hashed BSSID, the combined BSSID/channel data having a first number of bits comprising at least 48 bits, the hashed BSSID having a second number of bits which are less than the first number of bits of the combined BSSID/channel data; and
transmitting the hashed BSSID wirelessly within a physical layer frame/packet to a wireless device.

15. The method in accordance with claim 14 wherein the second number of bits is 10 bits or less.

16. The method in accordance with claim 15 further comprising:
transmitting the hashed BSSID wirelessly within a signal field of a preamble in the physical layer frame/packet.

* * * * *